(12) United States Patent
Tochigi et al.

(10) Patent No.: US 10,946,860 B2
(45) Date of Patent: Mar. 16, 2021

(54) VEHICLE CONTROL APPARATUS

(71) Applicant: TOYOTA JIDOSHA KABUSHIKI KAISHA, Toyota (JP)

(72) Inventors: Kohei Tochigi, Susono (JP); Shin Tanaka, Numazu (JP); Masahiko Adachi, Susono (JP); Shogo Ito, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 197 days.

(21) Appl. No.: 16/367,770

(22) Filed: Mar. 28, 2019

(65) Prior Publication Data
US 2019/0299995 A1 Oct. 3, 2019

(30) Foreign Application Priority Data
Apr. 3, 2018 (JP) .............................. JP2018-071891

(51) Int. Cl.
| | |
|---|---|
| *B60W 30/18* | (2012.01) |
| *B60W 30/165* | (2020.01) |
| *B60W 40/04* | (2006.01) |
| *B60W 10/18* | (2012.01) |
| *B60W 10/20* | (2006.01) |
| *B60W 10/04* | (2006.01) |

(52) U.S. Cl.
CPC .... *B60W 30/18109* (2013.01); *B60W 30/165* (2013.01); *B60W 40/04* (2013.01); *B60W 10/04* (2013.01); *B60W 10/18* (2013.01); *B60W 10/20* (2013.01); *B60W 2420/42* (2013.01); *B60W 2420/52* (2013.01)

(58) Field of Classification Search
CPC ......... B60W 30/18109; B60W 30/165; B60W 40/04
See application file for complete search history.

(56) References Cited

U.S. PATENT DOCUMENTS

| | | | | |
|---|---|---|---|---|
| 8,996,275 B2 * | 3/2015 | Nabeshima | ............ | B60K 31/00 701/96 |
| 9,050,951 B2 * | 6/2015 | Suzuki | ...................... | B60T 8/17 |

(Continued)

FOREIGN PATENT DOCUMENTS

| | | |
|---|---|---|
| JP | 2007-076472 A | 3/2007 |
| WO | 2014/076759 A1 | 5/2014 |

*Primary Examiner* — Ramsey Refai
(74) *Attorney, Agent, or Firm* — Sughrue Mion, PLLC

(57) ABSTRACT

A vehicle control apparatus is provided with: a calculator configured to calculate a plurality of controlled variables for decelerating a host vehicle, if there are a plurality of deceleration targets ahead in a traveling direction of the host vehicle, in association with the plurality of deceleration targets; an output device configured to select and output one controlled variable from the plurality of controlled variables; and a controller programmed to perform the deceleration support control on the basis of the one controlled variable. When a deceleration support control is performed on the basis of a first controlled variable as the one controlled variable, the output device outputs a second controlled variable, which is different from the first controlled variable out of the plurality of controlled variables, instead of the first controlled variable as the one controlled variable, on condition that the second controlled variable is greater than a switching controlled variable.

3 Claims, 4 Drawing Sheets

(56) References Cited

U.S. PATENT DOCUMENTS

| | | | |
|---|---|---|---|
| 9,469,299 B2 * | 10/2016 | Niwa | B60W 30/143 |
| 10,766,488 B2 * | 9/2020 | Tokimasa | G01S 13/931 |
| 2009/0164109 A1 * | 6/2009 | Maruyama | G08G 1/22 |
| | | | 701/116 |
| 2015/0274162 A1 | 10/2015 | Sato | |

* cited by examiner

VEHICLE CONTROL APPARATUS

CROSS-REFERENCE TO RELATED APPLICATIONS

This application is based upon and claims the benefit of priority of the prior Japanese Patent Application No. 2018-071891, filed on Apr. 3, 2018, the entire contents of which are incorporated herein by reference.

BACKGROUND

1. Technical Field

Embodiments of the present disclosure relate to a vehicle control apparatus, and particularly to a vehicle control apparatus configured to perform a deceleration support control.

2. Description of the Related Art

For this type of apparatus, for example, there is proposed an apparatus configured to perform a plurality of types of driving assistance, wherein if at least two driving assistances are performed within a prescribed time on the basis of a plurality of types of assistance elements, the apparatus is configured to arbitrate the at least two driving assistances and to prevent two or more driving assistances from being performed within the prescribed time (refer to International Publication WO2014/076759 (Patent Literature 1)). In addition, a related technology/technique is described in Japanese Patent Application Laid Open No. 2007-076472 (Patent Literature 2)).

Consideration is given to a situation in which when a deceleration support is performed on one target, another target that requires the deceleration support approaches a host vehicle. In this situation, as in a technology/technique described in the aforementioned Patent Literature 1, if two driving assistances are arbitrated in accordance with time, there is a possibility that the deceleration is insufficient for the other target when the target of the deceleration support is changed from the one target to the other target.

SUMMARY

In view of the aforementioned problems it is therefore an object of embodiments of the present disclosure to provide a vehicle control apparatus configured to appropriately perform a deceleration support even though there are a plurality of targets of the deceleration support.

The above object of embodiments of the present disclosure can be achieved by a vehicle control apparatus configured to perform a deceleration support control of decelerating a host vehicle on condition that there is a deceleration target, requires decelerating the host vehicle, ahead in a traveling direction of the host vehicle, the vehicle control apparatus provided with: a calculator configured to calculate a plurality of controlled variables for decelerating the host vehicle, if there are a plurality of deceleration targets ahead in the traveling direction of the host vehicle, in association with the plurality of deceleration targets; an output device configured to select and output one controlled variable from the plurality of controlled variables; and a controller programmed or configured to perform the deceleration support control on the basis of the one controlled variable, wherein when the deceleration support control is performed on the basis of a first controlled variable, which is the one controlled variable, the output device is configured to output a second controlled variable, which is different from the first controlled variable out of the plurality of controlled variables, instead of the first controlled variable as the one controlled variable, on condition that the second controlled variable is greater than a switching controlled variable, which is a value that is greater than the first controlled variable by a predetermined value.

DETAILED DESCRIPTION OF THE EMBODIMENTS

A vehicle control apparatus according to an embodiment of the present disclosure will be explained with reference to FIG. 1 to FIG. 4.

(Configuration)

Figure 1:
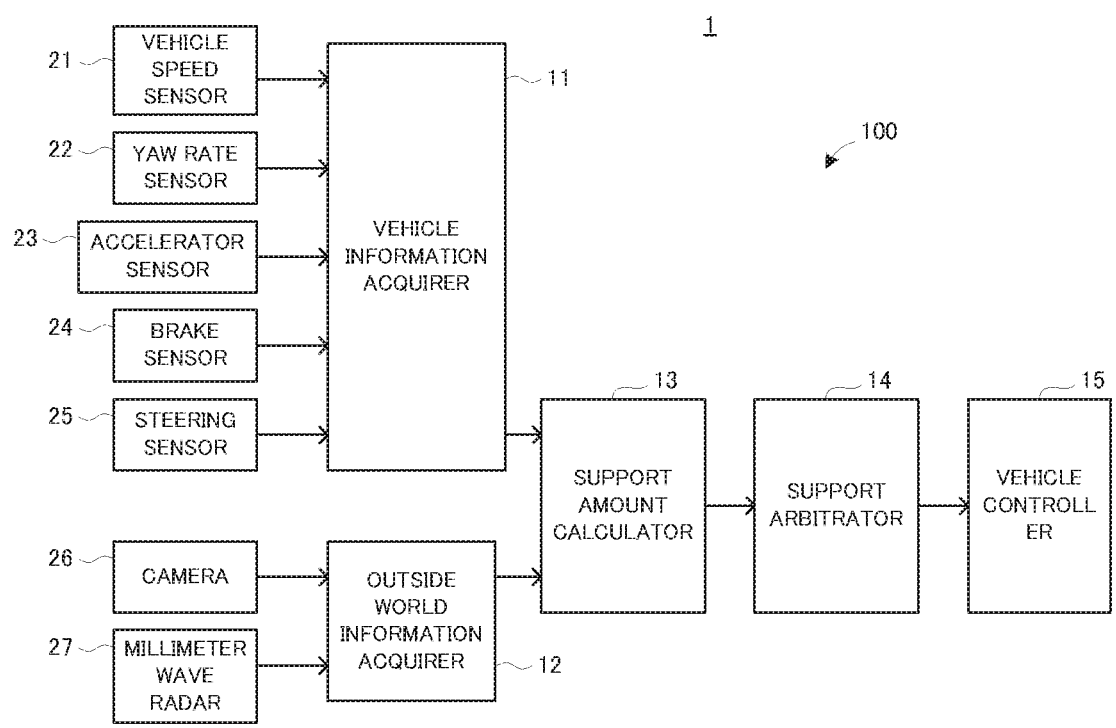
FIG. 1 is a block diagram illustrating a configuration of a vehicle control apparatus according to an embodiment.

A configuration of the vehicle control apparatus according to the embodiment will be explained with reference to FIG. 1. FIG. 1 is a block diagram illustrating the configuration of the vehicle control apparatus according to the embodiment.

In FIG. 1, a vehicle control apparatus 100 is mounted on a vehicle 1. The vehicle control apparatus 100 is configured to perform a deceleration support control of automatically decelerating the vehicle 1 particularly if there is a target that requires the deceleration of the vehicle 1 (hereinafter referred to as a "deceleration target" as occasion demands) ahead in a traveling direction of the vehicle 1, such as, for example, a traffic light with a red light color and a preceding vehicle that is slower than the vehicle 1. The vehicle control apparatus 100 is provided with a vehicle information acquirer 11, an outside world information acquirer 12, a support amount calculator 13, a support arbitrator 14, and a vehicle controller 15.

The vehicle information acquirer 11 is configured to obtain vehicle information indicating a state of the vehicle 1, for example, from respective outputs of a vehicle speed sensor 21, a yaw rate sensor 22, an accelerator sensor 23, a brake sensor 24, and a steering sensor 25.

The outside world information acquirer 12 is configured to obtain outside world information indicating a situation around the vehicle 1, for example, from an image taken by a camera 26 and a detection result of a millimeter wave radar 27. The outside world information includes, for example, the position and speed of another vehicle and a pedestrian that are around the vehicle 1, the position and state information (e.g., information indicating a light color) of a traffic light, the position and type of a sign and a road marking, travel route information (e.g., a shape, etc.). The outside world information acquirer 12 is further configured to detect a deceleration target from the obtained outside world information.

The support amount calculator 13 is configured to calculate a required deceleration for decelerating the vehicle 1, on the basis of the vehicle information and the outside world information, for example, in such a manner that a speed of the vehicle 1 at a target position set in accordance with the deceleration target approaches a target speed, if the deceleration target is detected. If a plurality of deceleration targets are detected, the support amount calculator 13 is particularly configured to calculate a plurality of required decelerations respectively corresponding to the plurality of deceleration targets.

Regarding the "target position set in accordance with the deceleration target", for example, if the deceleration target is a traffic light, a position of a stop line corresponding to the traffic light may be set as the target position. If the deceleration target is a preceding vehicle, a position that is a predetermined distance away from a rear end of the preceding vehicle may be set as the target position. A method of calculating the required deceleration, i.e., a support amount, is not limited to the aforementioned method, and various existing aspects can be applied.

If a plurality of required decelerations respectively corresponding to a plurality of deceleration targets are calculated by the support amount calculator 13 due to the detection of the plurality of deceleration targets, the support arbitrator 14 is configured to arbitrate the plurality of required decelerations (which will be described in detail later). The support arbitrator 14 is configured to output an arbitrated required deceleration to the vehicle controller 15. If there is only one required deceleration calculated by the support amount calculator 13, the support arbitrator 14 is configured to output the target deceleration to the vehicle controller 15 without a change.

The vehicle controller 15 is programmed or configured to control not-illustrated various actuators on the basis of the required deceleration outputted from the support arbitrator 14. Specifically, the vehicle controller 15 may realize the required deceleration, for example, by preventing an acceleration control (i.e., by controlling a throttle actuator), by performing a brake control (i.e., by controlling a brake actuator), or by performing similar controls.

(Deceleration Support Process)

Next, a deceleration support process performed by the vehicle control apparatus 100 as configured above will be explained. Particularly in the embodiment, an explanation will be given to a deceleration support process when the plurality of deceleration targets are detected during the running of the vehicle 1 on which the vehicle control apparatus 100 is mounted, with reference to FIG. 2 to FIG. 4.

Figure 2:
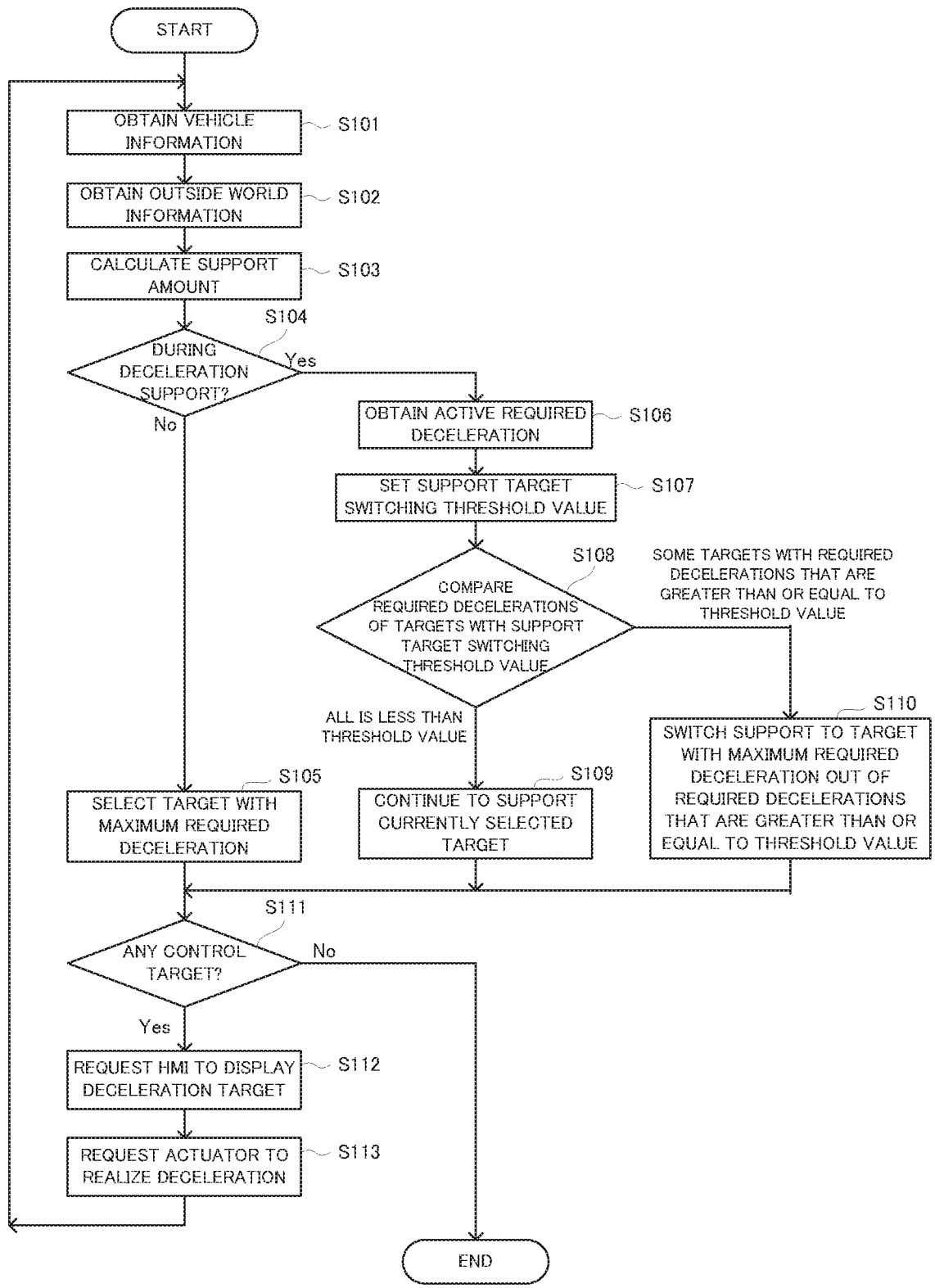
FIG. 2 is a flowchart illustrating a deceleration support process according to the embodiment.

In FIG. 2, the vehicle information acquirer 11 obtains the vehicle information (step S101). In parallel with the step S101, the outside word information acquirer 12 obtains the outside world information (step S102). In the step S102, the outside word information acquirer 12 further detects the deceleration target from the outside world information. Here, the plurality of deceleration targets shall be detected.

The support amount calculator 13 then calculates the plurality of required decelerations respectively corresponding to the plurality of deceleration targets, on the basis of the vehicle information and the outside world information (step S103). The support arbitrator 14 determines whether or not the deceleration support control is performed, i.e., whether or not the various actuators are controlled on the basis of the required decelerations by the vehicle controller 15 (step S104).

In the step S104, if it is determined that the deceleration support control is not performed (the step S104: No), the support arbitrator 14 selects a deceleration target with the maximum required deceleration from the plurality of deceleration targets (step S105). As a result, the support arbitrator 14 outputs the required deceleration associated with the selected deceleration target, to the vehicle controller 15. The vehicle controller 15 controls the various actuators on the basis of the required deceleration outputted from the support arbitrator 14, by which the deceleration support control is started for the selected deceleration target (refer to a step S113 described later).

The vehicle control apparatus 100 then determines whether or not there is any control target (step S111), for example, on the basis of a detection result of the deceleration target by the outside information acquirer 12. The expression "there is no control target" may mean that the deceleration target no longer exists (e.g., a situation in which there is no other vehicle, which is the deceleration target, ahead in the traveling direction of the vehicle 1 due to a route change or the like, or a situation in which the traffic light no longer corresponds to the deceleration target because the light color of the traffic light is changed from red to green, etc.), or that the deceleration support control is unnecessary, for example, because the speed of the vehicle 1 reaches the target speed.

In the step S111, if it is determined that there is no control target (the step S111: No), the process illustrated in FIG. 2 is ended. On the other hand, in the step S111, if it is determined that there is a control target (the step S111: Yes), the support arbitrator 14 outputs information indicating the deceleration target and the required deceleration associated with the deceleration target, to the vehicle controller 15.

The vehicle controller 15 requests a not-illustrated human machine interface (HMI) to display the current deceleration target of the deceleration support control on the basis of the information indicating the deceleration target (step S112), and controls the various actuators to realize the required deceleration, i.e., requests the various actuators to realize the required deceleration (step S113). Then, the step S101 is performed again.

In the step S104, if it is determined that the deceleration support control is performed (the step S104: Yes), the support arbitrator 14 obtains an active required deceleration, i.e., the required deceleration associated with the current deceleration target of the deceleration support control (step S106). The support arbitrator 14 then applies a predetermined deceleration to the active required deceleration, thereby setting a support target switching threshold value (step S107).

The aforementioned "predetermined deceleration" may be a fixed value set in advance, or a variable value corresponding to some physical quantity or parameter. If the "predetermined deceleration" is a fixed value, the "predetermined deceleration" may be set, for example, in accordance with variations in recognition accuracy of various sensors related to the calculation of the required deceleration, the deceleration generated in the vehicle 1 when an accelerator is off and/or when a brake is off, or the like.

If the "predetermined deceleration" is a variable value, the "predetermined deceleration" may be set, for example, in accordance with the active required deceleration. Alternatively, if the "predetermined deceleration" is a variable value, the "predetermined deceleration" may be set, for example, in accordance with a relation between the vehicle 1 and the deceleration target (e.g., a distance between the vehicle 1 and the deceleration target, a relative speed between the vehicle 1 and the deceleration target, a time to collision (TTC), etc.), or in accordance with the execution/non-execution of a brake operation by the driver of the vehicle 1.

If the "predetermined deceleration" is a variable value corresponding to the active required deceleration and if the active required deceleration is relatively small, the "predetermined deceleration" may be set to be greater than that when the active required deceleration is relatively large. If the "predetermined deceleration" is a variable value corresponding to the distance between the vehicle 1 and the deceleration target and if the distance is relatively long, the "predetermined deceleration" may be set to be greater than the predetermined deceleration when the distance is relatively short. If the "predetermined deceleration" is a variable value corresponding to the relative speed between the vehicle 1 and the deceleration target and if the relatively speed is relatively low, the "predetermined deceleration" may be set to be greater than the predetermined deceleration when the relative speed is relatively high. If the "predetermined deceleration" is a variable value corresponding to the TTC and if the TTC is relatively large, the "predetermined deceleration" may be set to be greater than the predetermined deceleration when the TTC is relatively small. If the "predetermined deceleration" is a variable value corresponding to the execution/non-execution of the brake operation by the driver and if the brake operation is performed, the "predetermined deceleration" may be set to be greater than the predetermined deceleration when the brake operation is not performed.

The support arbitrator 14 then compares the required decelerations associated with the deceleration targets other than the current deceleration target of the deceleration support control out of the plurality of deceleration targets, with the support target switching threshold value (step S108). In the step S108, if all the required decelerations associated with the deceleration targets other than the current deceleration target of the deceleration support control are less than the support target switching threshold value (the step S108: ALL IS LESS THAN THRESHOLD VALUE) the support arbitrator 14 maintains the current deceleration target of the deceleration support control (step S109).

On the other hand, in the step S108, if there are some deceleration targets with the required decelerations that are greater than or equal to the support target switching threshold value (the step S108: SWITCH SUPPORT TO TARGET WITH MAXIMUM REQUIRED DECELERATION OUT OF REQUIRED DECELERATIONS THAT ARE GREATER THAN OR EQUAL TO THRESHOLD VALUE), the support arbitrator 14 selects a deceleration target with the maximum required deceleration from the deceleration targets with the required decelerations that are greater than or equal to the support target switching threshold value (step S110). As a result, the deceleration target of the deceleration support control is changed.

At this time, the support arbitrator 14 may limit a change amount per unit time (i.e., a jerk) of the required deceleration in order to prevent an abrupt change in the behavior of the vehicle 1 caused by the deceleration support control. Specifically, the support arbitrator 14 may set a control variable time change threshold value as a limit value of the change amount per unit time of the required deceleration. If the change amount per unit time of the required deceleration, which is to be outputted to the vehicle controller 15, exceeds the control variable time change threshold value, the support arbitrator 14 may adjust the required deceleration in such a manner that the change amount per unit time is less than or equal to the control variable time change threshold value.

Now, an example of a method of setting the control variable time change threshold value will be explained with reference to a flowchart in FIG. 3. A process illustrated in FIG. 2 may be performed in parallel with the process illustrated in FIG. 2.

Figure 3:
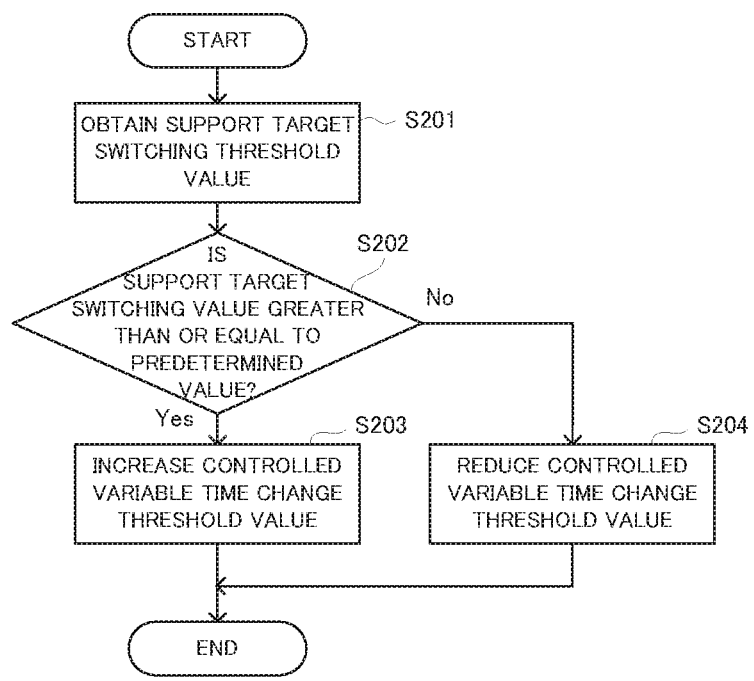
FIG. 3 is a flowchart illustrating a time change threshold value setting process according to the embodiment.

In FIG. 3, the support arbitrator 14 obtains the support target switching threshold value set in the step S107 described above (step S201). The support arbitrator 14 then determines whether or not the support target switching threshold value is greater than or equal to a predetermined value (step S202).

In the step S202, if it is determined that the support target switching threshold value is greater than or equal to the predetermined value (the step S202: Yes), the support arbitrator 14 increases the controlled variable time change threshold value (step S203). Here, the expression " . . . increases the controlled variable time change threshold value" may mean, for example, to make it greater than a current value (or an initial value) of the controlled variable time change threshold value. Alternatively, if there are two candidates of the controlled variable time change threshold value, the expression may mean to select one with a larger value from the two candidates.

On the other hand, in the step S202, if it is determined that the support target switching threshold value is less than the predetermined value (the step S202: No), the support arbitrator 14 reduces the controlled variable time change threshold value (step S204). Here, the expression " . . . reduces the controlled variable time change threshold value" may mean, for example, to make it less than the current value (or the initial value) of the controlled variable time change threshold value. Alternatively, if there are two candidates of the controlled variable time change threshold value, the expression may mean to select one with a smaller value from the two candidates.

If the step S110 is performed, in other words, if the deceleration target of the deceleration support control is changed from one deceleration target to another deceleration target, the required deceleration associated with the other deceleration target is estimated to be a relatively large deceleration because it is greater than or equal to the support target switching threshold value (i.e., a value obtained by applying the predetermined deceleration to the required deceleration associated with the one deceleration target). In other words, if the deceleration target of the deceleration support control is changed from one deceleration target to another deceleration target, the vehicle 1 is estimated to be relatively close to the other deceleration target. At this time, if the controlled variable time change threshold value is relatively small, the deceleration generated in the vehicle 1 by the deceleration support control may be relatively small. That may relatively increase a possibility that the vehicle 1 collides with the other deceleration target. Alternatively, the driver of the vehicle 1 likely performs the brake operation in order to avoid the collision with the other deceleration target. On the other hand, if the controlled variable time change threshold value is set as a fixed value and if the support target switching value is relatively small, an excessive deceleration may be generated in the vehicle 1 in changing the deceleration target because the required deceleration associated with the one deceleration target is relatively small, which possibly reduces ride comfort.

The embodiment is thus configured to achieve (i) the proper avoidance of the collision between the vehicle 1 and another deceleration target and (ii) the ride comfort of the vehicle 1, by changing the controlled variable time change threshold value in accordance with a result of the comparison between the support target switching threshold value and the predetermined value. The "predetermined value" in the step S202 may be a value for determining whether or not to increase the controlled variable time change threshold value, and may be set as a fixed value in advance, or as a variable value corresponding to some physical quantity or parameter. Regarding the "predetermined value", for example, a relation between the support target switching threshold value and a collision probability (e.g., TTC) between the vehicle 1 and another deceleration target (i.e., a deceleration target after the target is changed) may be firstly obtained by experiments, experiences, or simulations. Then, on the basis of the relation, the predetermined value may be set as the support target switching threshold value in which the collision probability is an upper limit of an allowable range.

The controlled variable time change threshold value may be also set in a period other than a time of changing the deceleration target.

The aforementioned deceleration support process will be more specifically explained with reference to FIG. 4. Here, the deceleration target shall be a target A and a target B. In an upper graph of FIG. 4, a "dotted line" indicates a time change of the required deceleration associated with the target A calculated by the support amount calculator 13, a "dashed line" indicates a time change of the required deceleration associated with the target B calculated by the support amount calculator 13, an "alternate long and short dash line" indicates a time change of the support target switching threshold value, and a "solid line" indicates the required deceleration outputted to the vehicle controller 15 from the support arbitrator 14 (corresponding to the aforementioned "active required deceleration"). In the upper graph of FIG. 4, a difference between the "solid line" and the "alternate long and short dash line" corresponds to the aforementioned "predetermined deceleration".

Figure 4:
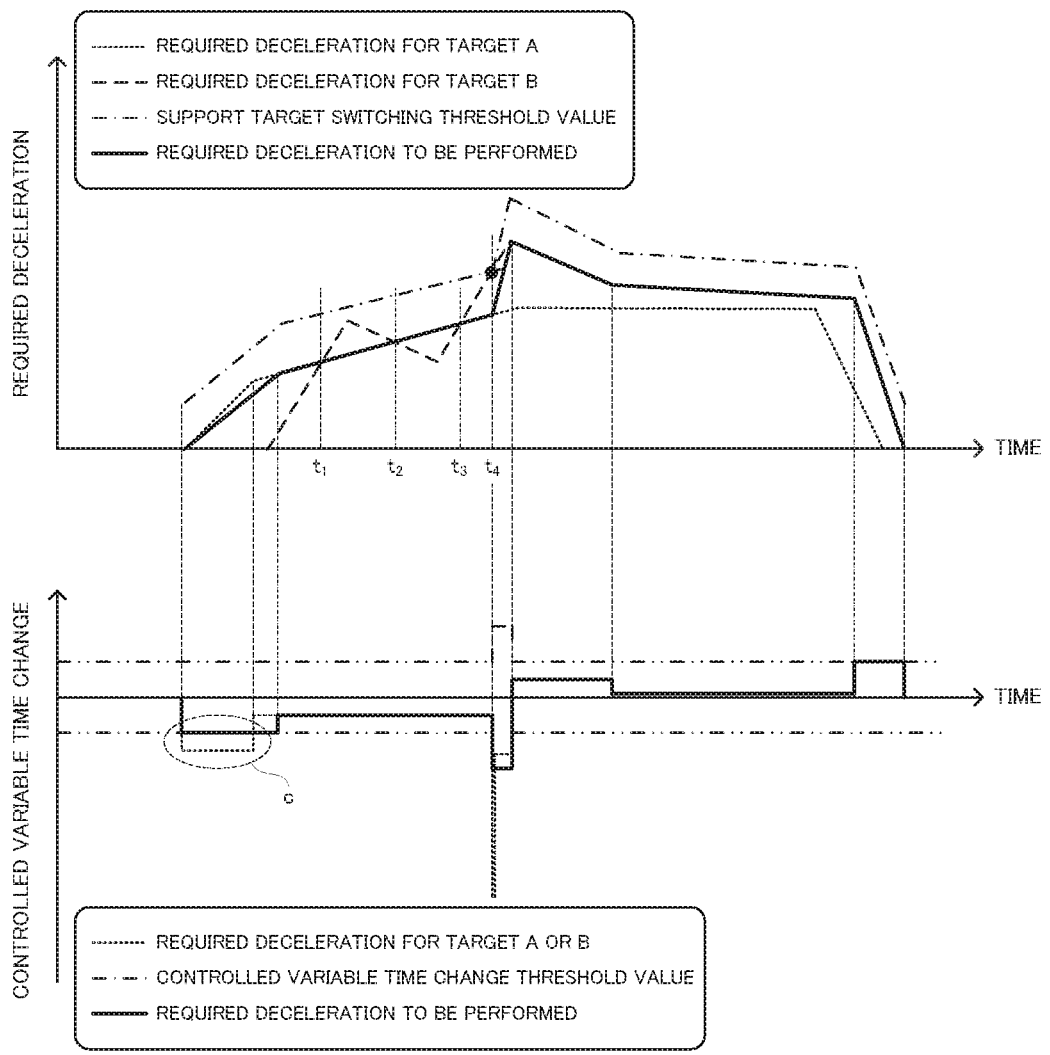
FIG. 4 is a timing chart illustrating an example of a deceleration support control according to the embodiment.

In an example illustrated in the upper graph of FIG. 4, until a time point $t_4$, the target A is selected as the deceleration target of the deceleration support control, and after the time point $t_4$, the target B is selected as the deceleration target of the deceleration support control. In other words, in the example illustrated in the upper graph of FIG. 4, at the time point $t_4$, the deceleration target of the deceleration support control is changed from the target A to the target B.

As illustrated in the upper graph of FIG. 4, in a period between a time point $t_1$ and a time point $t_2$, the required deceleration associated with the target B is greater than the required deceleration associated with the target A, but is less than the support target switching threshold value. Thus, the process proceeds from the step S108 to the step S109, and the target A is maintained as the deceleration target of the deceleration support control. Moreover, as illustrated in the upper graph of FIG. 4, in a period after a time point $t_3$ and before the time point $t_4$, the required deceleration associated with the target B is also greater than the required deceleration associated with the target A, but is less than the support target switching threshold value. Thus, the process proceeds from the step S108 to the step S109, and the target A is maintained as the deceleration target of the deceleration support control.

As illustrated in the upper graph of FIG. 4, at the time point $t_4$, the required deceleration associated with the target B becomes greater than or equal to the support target switching threshold value. Thus, the process proceeds from the step S108 to the step S110, and the target B is selected as the deceleration target of the deceleration support control.

A lower graph of FIG. 4 illustrates a time change of the controlled variable time change threshold value. In the lower graph of FIG. 4, a "dotted line" indicates a change amount per unit time of the required deceleration associated with the target A or the target B, an "alternate long and two short dashes line" indicates a time change of the support target switching threshold value, and a "solid line" indicates a change amount per unit time of the required deceleration outputted to the vehicle controller 15 from the support arbitrator 14 (corresponding to the aforementioned "active required deceleration").

Here, particularly at the time point $t_4$ at which the deceleration target of the deceleration support control is changed from the target A to the target B, the change amount per unit time caused by the transfer from the required deceleration associated with the target A to the required deceleration associated with the target B exceeds the controlled variable time change threshold value. The support arbitrator 14 thus may adjust the required deceleration outputted to the vehicle controller 15, on the basis of the required deceleration calculated by the support amount calculator 13 (which is herein at least one of the required deceleration associated with the target A and the required deceleration associated with the target B) in such a manner that the change amount per unit time of the required deceleration outputted to the vehicle controller 15 is less than or equal to the controlled variable time change threshold value.

Not only when the deceleration target of the deceleration support control is changed from the target A to the target B, but also when the required deceleration exceeds the controlled variable time change threshold value, the support arbitrator 14 may adjust the required deceleration outputted to the vehicle controller 15, on the basis of the required deceleration calculated by the support amount calculator 13 (which is herein the required deceleration associated with the target A, or the required deceleration associated with the target B) in such a manner that the change amount per unit time of the required deceleration outputted to the vehicle controller 15 is less than or equal to the controlled variable time change threshold value (refer to a period surrounded by a dashed circle c in the graph in the lower graph of FIG. 4).

(Technical Effect) On the vehicle control apparatus 100, when one target is the deceleration target of the deceleration support control, it is determined whether or not the deceleration target of the deceleration support control is changed from the one target to another target on the basis of a result of the comparison between the required deceleration associated with the other deceleration target and the support target switching threshold value, which is a value obtained by applying the predetermined deceleration to the required deceleration associated with the one deceleration target.

If the deceleration target of the deceleration support control is changed on the basis of a magnitude relation between the required deceleration associated with the one deceleration target and the required deceleration associated with the other deceleration target without introducing the support target switching threshold value, the deceleration target is possibly relatively frequently changed, and hunting possibly occurs in the vehicle behavior. Moreover, if the deceleration target of the deceleration support control is changed, the display of the HMI (refer to the step S112 described above) is also changed. Thus, if the deceleration target is relatively frequently changed, the driver possibly feels uncomfortable.

In the example illustrated in the upper graph of FIG. 4, if the deceleration target of the deceleration support control is changed on the basis of a magnitude relation between the required deceleration associated with the target A and the required deceleration associated with the target B, the deceleration target is changed from the target A to the target B at the time point $t_1$, from the target B to the target A at the time point $t_2$, and from the target A to the target B at the time point $t_3$.

If the second change of the deceleration target is prohibited in a predetermined time after the first change of the deceleration target in order to prevent the deceleration target of the deceleration support control from being frequently changed, the change of the deceleration target may be delayed from an appropriate timing. The delayed change of the deceleration target may cause a relatively large deceleration, which may give an uneasy feeling to the driver.

On the vehicle control apparatus 100, however, as described above, when one deceleration target is the deceleration target of the deceleration support control, the change of the deceleration target is determined on the basis of a result of the comparison between the required deceleration associated with another deceleration target and the support target switching threshold value. It is thus possible to prevent the deceleration target of the deceleration support control from being frequently changed, and also to prevent the change of the deceleration target from being delayed from the appropriate timing.

Various aspects of embodiments of the present disclosure derived from the embodiment explained above will be explained hereinafter.

A vehicle control apparatus according to an aspect of embodiments of the present disclosure is a vehicle control apparatus configured to perform a deceleration support control of decelerating a host vehicle on condition that there is a deceleration target, which is a target to be decelerated by the host vehicle, ahead in a traveling direction of the host vehicle, the vehicle control apparatus provided with: a calculator configured to calculate a plurality of controlled variables for decelerating the host vehicle, if there are a plurality of deceleration targets ahead in the traveling direction of the host vehicle, in association with the plurality of deceleration targets; an output device configured to select and output one controlled variable from the plurality of controlled variables; and a controller programmed or configured to perform the deceleration support control on the basis of the one controlled variable, wherein when the deceleration support control is performed on the basis of a first controlled variable, which is the one controlled variable, the output device is configured to output a second controlled variable, which is different from the first controlled variable out of the plurality of controlled variables, instead of the first controlled variable as the one controlled variable, on condition that the second controlled variable is greater than a switching controlled variable, which is a value that is greater than the first controlled variable by a predetermined value.

In the aforementioned embodiment, the "support amount calculator 13" corresponds to an example of the "calculator", the "support arbitrator 14" corresponds to an example of the "output device", and the "vehicle controller 15" corresponds to an example of the "controller". In the aforementioned embodiment, the "support target switching threshold value", the "predetermined deceleration", the "required deceleration associated with the target A", and the "required deceleration associated with the target B" respectively correspond to the "switching controlled variable", the "first predetermined value", the "first controlled variable", and the "second controlled variable".

On the vehicle control apparatus, the change between the first controlled variable and the second controlled variable" is performed not on the basis of a result of the comparison between the first controlled variable and the second controlled variable, but on the basis of a result of the comparison between the second controlled variable and the switching controlled variable. It is thus possible to prevent the deceleration target corresponding to the first controlled variable and the deceleration target corresponding to the second controlled variable from being frequently changed, on the vehicle control apparatus. In addition, it is possible to prevent a change timing of the deceleration target from being delayed from the appropriate timing on the vehicle control apparatus, in comparison with an apparatus according to a comparative example in which the second change of the deceleration target is prohibited in a predetermined time after the first change of the deceleration target in order to prevent the deceleration target from being frequently changed. Therefore, according to the vehicle control apparatus, the deceleration support control can be appropriately performed even if there are a plurality of deceleration targets.

In an aspect of the vehicle control apparatus, the output device is configured to adjust the one controlled variable on the basis of at least one of the first controlled variable and the second controlled variable, in such a manner that a change amount per unit time associated with the one controlled variable is less than or equal to a time change threshold value, on condition that the change amount per unit time associated with the one controlled variable is greater than the time change threshold value when the second variable is outputted instead of the first controlled variable as the one controlled variable. According to this aspect, it is possible to prevent an abrupt change in the vehicle behavior in changing the deceleration target. In the aforementioned embodiment, the "controlled variable time change threshold value" corresponds to an example of the "time change threshold value".

In this aspect, the output device is configured to increase the time change threshold value when the switching controlled variable is greater than a second predetermined value, in comparison with when the switching controlled variable is less than the second predetermined value. By virtue of such a configuration, it is possible to achieve (i) the avoidance of a collision between the host vehicle and a deceleration target after the change (i.e., the deceleration target corresponding to the second controlled variable) and (ii) the ride comfort of the host vehicle. In the aforementioned embodiment, the "predetermined value" in the step S202 corresponds to an example of the "second predetermined value".

The present disclosure can be applied not only to a vehicle operated by a driver, but also to an automatic drive vehicle.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A vehicle control apparatus configured to perform a deceleration support control of decelerating a host vehicle on condition that there is a deceleration target, which requires decelerating the host vehicle, ahead in a traveling direction of the host vehicle, said vehicle control apparatus comprising:

a calculator configured to calculate a plurality of controlled variables for decelerating the host vehicle, if there are a plurality of deceleration targets ahead in the traveling direction of the host vehicle, in association with the plurality of deceleration targets;

an output device configured to select and output one controlled variable from the plurality of controlled variables; and a controller programmed or configured to perform the deceleration support control on the basis of the one controlled variable, wherein when the deceleration support control is performed on the basis of a first controlled variable, which is the one controlled variable, said output device is configured to output a second controlled variable, which is different from the first controlled variable out of the plurality of controlled variables, instead of the first controlled variable as the one controlled variable, on condition that the second controlled variable is greater than a switching controlled variable, which is a value that is greater than the first controlled variable by a predetermined value.

2. The vehicle control apparatus according to claim 1, wherein said output device is configured to adjust the one controlled variable on the basis of at least one of the first controlled variable and the second controlled variable, in such a manner that a change amount per unit time associated with the one controlled variable is less than or equal to a time change threshold value, on condition that the change amount per unit time associated with the one controlled variable is greater than the time change threshold value when the second variable is outputted instead of the first controlled variable as the one controlled variable.

3. The vehicle control apparatus according to claim 1, wherein said output device is configured to increase the time change threshold value when the switching controlled variable is greater than a second predetermined value, in comparison with when the switching controlled variable is less than the second predetermined value.

* * * * *